Figure 1:
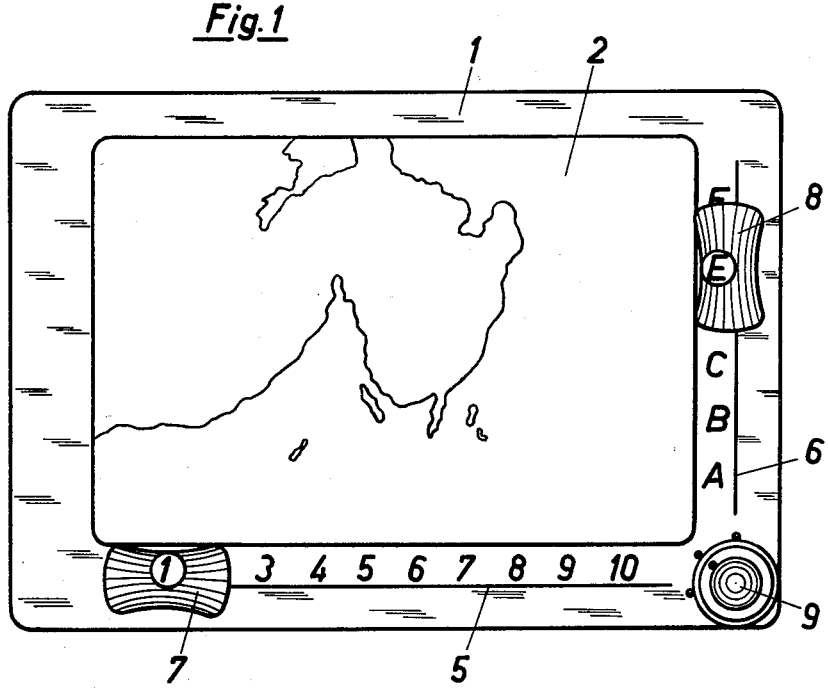

Nov. 6, 1962   J. HUTTERER   3,062,097
DEVICE FOR FEEDING PICTURES
Filed Oct. 23, 1959   4 Sheets-Sheet 1

INVENTOR
JOHANN HUTTERER
BY
ATTORNEYS

Nov. 6, 1962    J. HUTTERER    3,062,097
DEVICE FOR FEEDING PICTURES
Filed Oct. 23, 1959    4 Sheets-Sheet 2
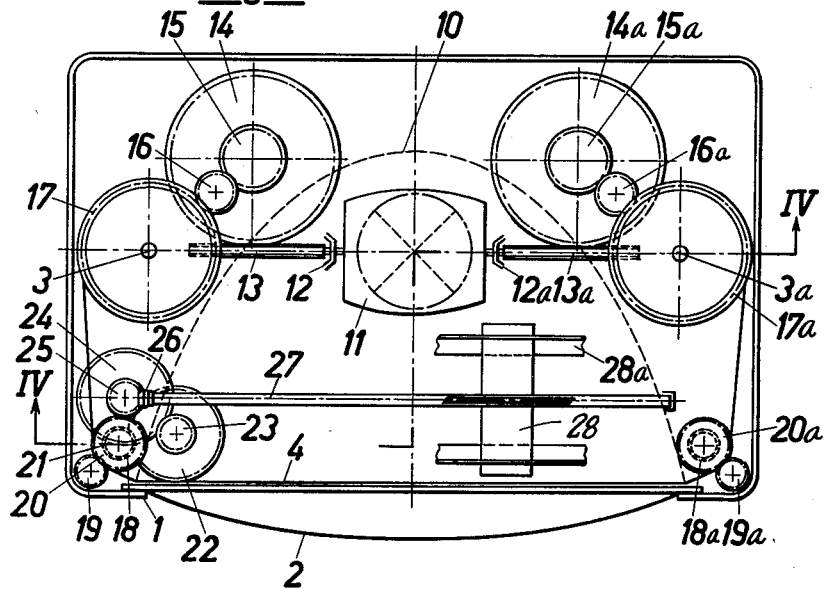
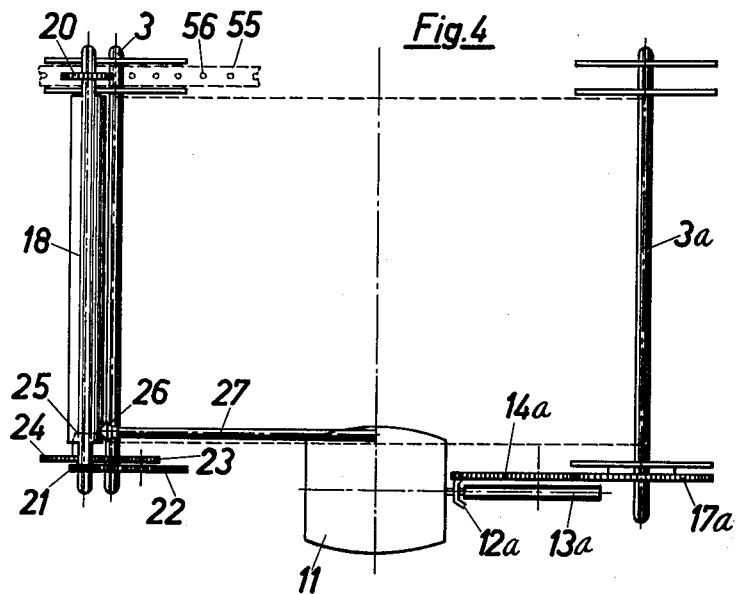
INVENTOR
JOHANN HUTTERER
BY
ATTORNEYS Nov. 6, 1962     J. HUTTERER     3,062,097
DEVICE FOR FEEDING PICTURES
Filed Oct. 23, 1959     4 Sheets-Sheet 3
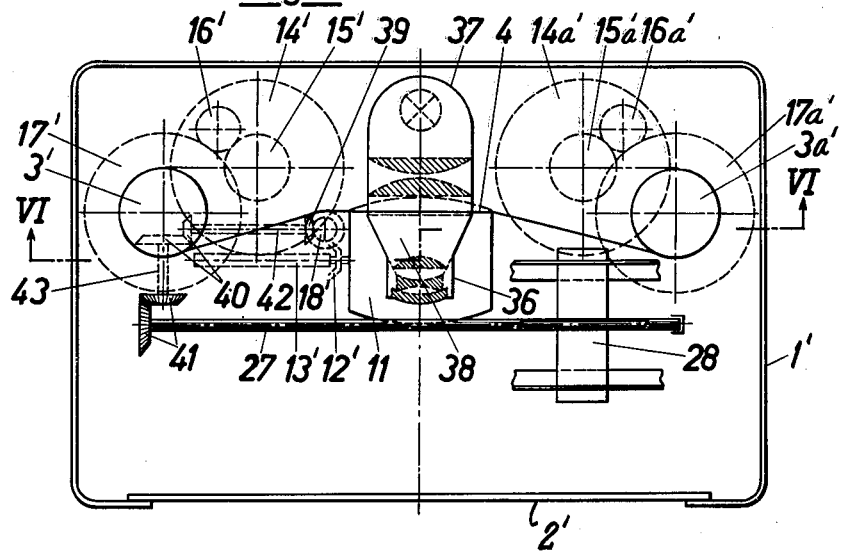
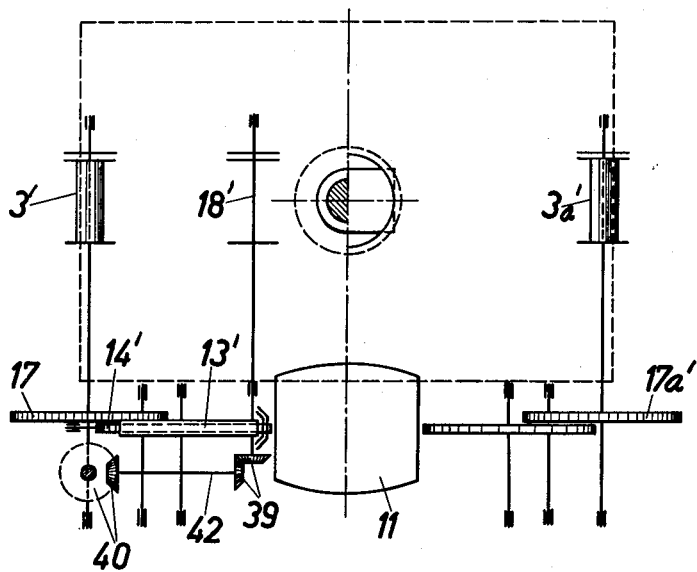
INVENTOR
JOHANN HUTTERER
BY *Tuieie + Smiley*
ATTORNEYS

United States Patent Office 3,062,097
Patented Nov. 6, 1962

3,062,097
DEVICE FOR FEEDING PICTURES
Johann Hutterer, 2 Negerlegasse, Vienna II, Austria
Filed Oct. 23, 1959, Ser. No. 848,397
9 Claims. (Cl. 88—28)

The invention relates to a device for feeding pictures, preferably transparencies, which are arranged in a series to form a strip, e.g., sections of a map, in front of the screen of a projecting device. The device is mainly intended for incorporation in the dashboard of motor vehicles, aircraft etc.

A device for reading sections of a map which have been combined to form a strip, has been disclosed, in which device the strip revolves together with an endless contact tape, which has an electrically non-conducting portion and moves past a contact pin which serves as a setting switch. The strip which carries the sections and with it the contact tape move as long as a conductive part of the tape contacts the contact pin, whereas this movement is stopped as soon as the nonconducting part of this tape engages the contact pin. The setting switch is displaceable along a scale which has as many marks as picture sections are provided in a revolving strip. This device has the disadvantage that only a very limited length is available for the scale if the device is to be incorporated in the dashboard of a motor vehicle. For this reason only a few settings are possible and only a few pictures can be accommodated on the strip. Owing to the small size of the screen each map picture can include only a relatively small area so that the driver must repeatedly replace the film strip, which is troublesome and disturbing during a prolonged trip.

The present invention eliminates the foregoing disadvantage and provides a switching mechanism which requires only a small space and yet enables the movement of a large number of map sections into the field of view.

It is a feature of the invention to provide a device comprising means for feeding the strip, a control element which is moved together with the strip and in accordance with a manual selecting operation arrests the means for feeding the strip at the desired time, said control element including a switch carriage moved along a row of control rails, said switch carriage having a number of wiper contacts, which according to their position relative to the control rails individually energize the means for feeding the strip.

Another feature of the invention is to provide each contact rail with a number of contacts and cooperative with two setting scales, one of which is provided with a group switch, which selectively connects the source of current to one of the control rails and the other of which by means of a multiple selector switch selectively connects one of the contacts of the control rail included by the group switch to the circuit of the group switch.

Finally, according to the invention the control rails are arranged in parallel and provided with three steps, the steps of each rail being so staggered relative to those of the other rails that the front end of the intermediate step of each rail lies over the rear end of the intermediate step of the preceding rail.

Figure 2:
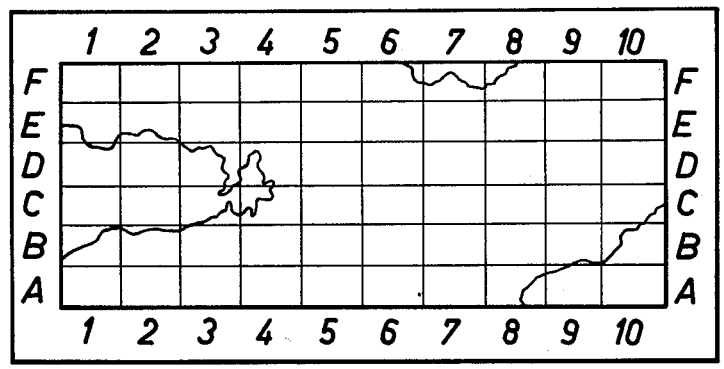
Figure 7:
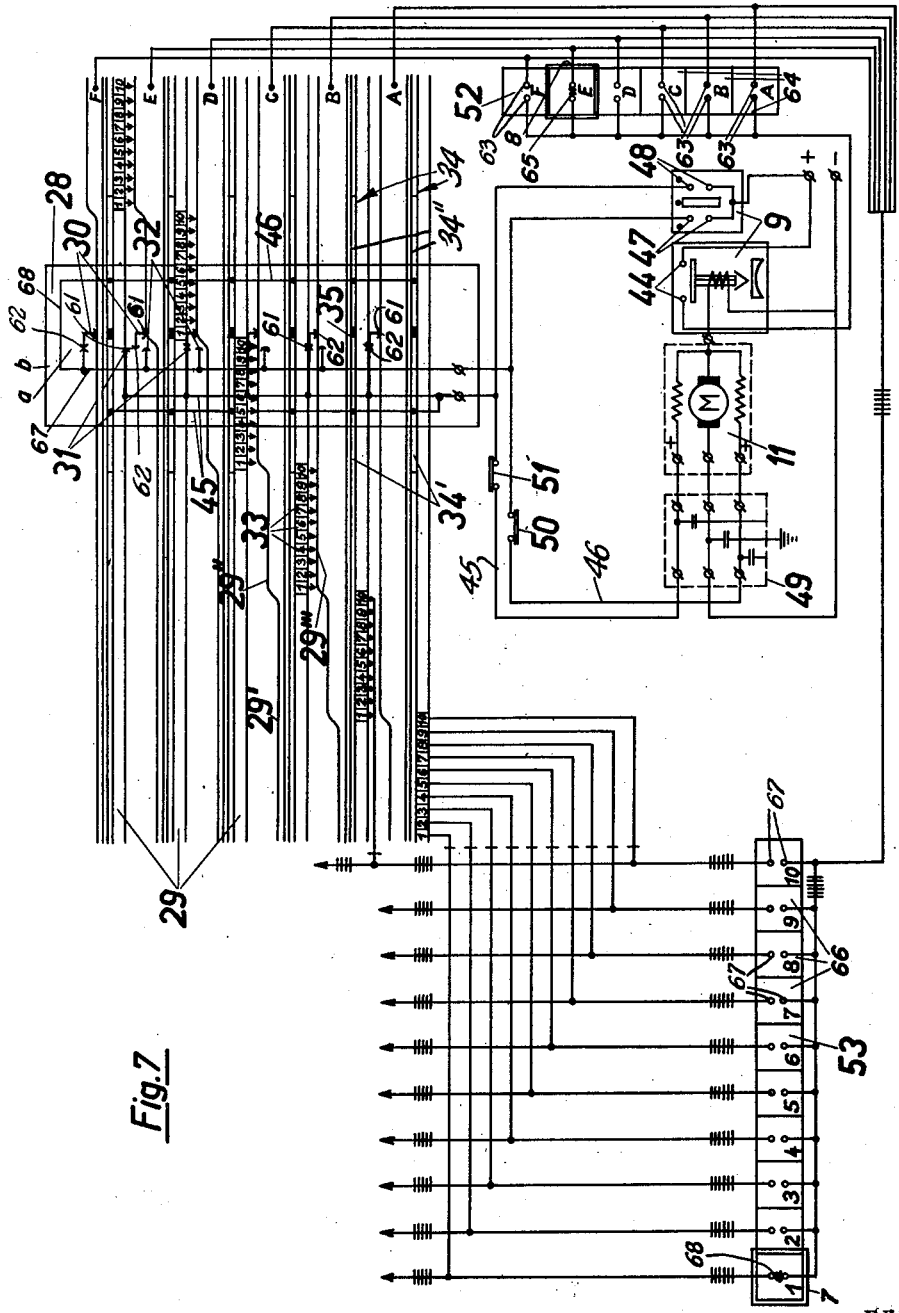

Further features of the invention will be explained with reference to the drawings, which show illustrative embodiments of devices according to the invention together with its control mechanism, a film being chosen as a carrier of the map sections. FIG. 1 is a front view showing the device. FIG. 2 shows a code map. FIG. 3 is top plan view showing the feeding mechanism. FIG. 4 is a sectional view taken on line IV—IV of FIG. 3. FIG. 5 is a top plan view showing a feeding mechanism with another projecting device. FIG. 6 is a sectional view taken on line VI—VI of FIG. 5 and FIG. 7 is a circuit diagram of the switch mechanism.

Referring now to the drawings in detail, specifically to FIGS. 1, 3 and 4, one modification of the invention comprises a screen 2, which is incorporated in a frame 1 and behind which a film 4 is moved, the ends of which are wound on a pair of reels 3, 3a respectively. The film 4 is provided with the pictures to be projected on the screen, in the present case sections of a map. Such a map is shown in FIG. 2. It is divided into sections, one of which appears on the screen 2 of FIG. 1. The frame 1 is provided with two scales 5, 6, along which setting knobs 7, 8 are adjustable. Besides, a push button or rotary knob 9 is provided for starting the mechanism for moving the film 4.

In the embodiment shown in FIG. 3 the several successive film frames have the size of the screen 2 and are projected thereon only by means of a reflector 10 disposed behind the film. To provide a clear showing of the arrangement of the other parts this reflector is only indicated with dash lines in FIG. 3.

The movement of the film reels 3, 3a is effected by a motor 11, the drive of which can be transmitted to either of these film reels by a clutch 12, 12a, a worm 13, 13a, a worm wheel 14, 14a and gears 15, 15a, 16, 16a and 17, 17a, the latter of which are connected to the spindles of the film reels 3, 3a. The motor 11 can be driven in both directions. One of the couplings 12 slips in one direction of rotation of the motor and the other clutch 12a slips in the other direction.

The film 4 moves around rollers 18, 18a which are disposed respectively adjacent the two front corners of the frame 1. Adjacent each roller 18, 18a a roller 19, 19a is disposed to urge the film against the respective roller 18, 18a. A feeding strip 55 (indicated in FIG. 4 by dash lines and only in part) extends parallel to the film (also shown by dash lines in FIG. 4) and is also wound on the reels 3, 3a and has marks, e.g. perforations 56, which are engaged by pinions 20 disposed at the top ends of the two rollers 18, 18a. At least one of the rollers 18, 18a carries at its lower end a pinion 21, which drives a feed screw 27 through the intermediary of gears 22, 23, 24 and bevel wheels 25 and 26. This feed screw 27 engages an appropriate screw thread formed in a switch carriage 28. The latter is guided by tracks 28a along a group of control rails 29 (FIG. 7), the number of which equals the number of marks on the scale 6 and are correspondingly identified. The upper surface of each of the rails 29 has three steps 29', 29", 29''', which are staggered in one direction by the length of the intermediate step 29" so that the intermediate step of each rail 29 begins over the end of the intermediate step of the preceding rail. A plurality of contacts 33 are mounted on each rail 29 in juxtaposition with and extending the length of the intermediate step 29" of the respective rail. The contacts 33 on each rail are equal in number to the marks on scale 5 and are correspondingly identified.

The switch carriage 28 supports a plurality of switch elements 30 and a plurality of contacts 31 and 32 cooperative therewith, there being one of the switch elements 30 for each rail 29. The switch elements 30 are mounted on the carriage 28 for movement in a direction perpendicular to that of carriage movement and these elements each include a wiper contact 61 engaged with the steps 29', 29", 29'''. The elements 30 also include wiper contacts 62 engageable with the corresponding contacts 31 and 32 depending upon the particular step with which the contact 61 of the respective element 30 is engaged.

The contacts 31 are disposed for engagement by the wiper contacts 62 of the respective switch elements 30 when their wiper contacts 61 engage the upper steps 29''' while the contacts 32 are disposed for engagement by the wiper contacts 62 of the switch elements 30 when their wiper contacts 61 engage the lower steps 29′, and when the wiper contacts 61 engage the intermediate steps 29″ the wiper contacts 62 of the respective elements 30 are intermediate the respective contacts 31 and 32.

The carriage 28 also supports a plurality of switch elements 34, one for each rail 29, and these elements 34 each include dual wiper contacts 34′ and 34″ separated by an insulated wiper block 35. The switch elements 34 are disposed on the carriage 28 to engage the respective bank of contacts 33. Each of the wiper contacts 34′, 34″ is of a length to span and engage simultaneously all of the contacts 33 of the respective rail. The contacts 31 and the wiper contacts 34′ are all connected by a conductor 45 with one field winding of the motor 11 while the contacts 32 and wiper contacts 34″ are all connected by a conductor 46 with a reverse field winding of the motor 11.

The control rails 29 and their banks of contacts 33 are included in circuit with the motor 11 by means of multiple selector switches 52 and 53 respectively associated with the scales 6 and 5. The selector switch 52 comprises a plurality of switches 64 equal in number to the rails 29 and correspondingly identified, and each of which has a pair of contacts 63 which may be electrically connected by a bridge 65 carried by the setting knob 8. Similarly, the selector switch 53 includes a plurality of switches 66 equal in number to the contacts 33 and correspondingly identified, and each of which has a pair of contacts 67 which may be electrically connected by a bridge 68 carried by the setting knob 7.

The master control switch 9 includes a pair of contacts 44 for automatic operation and two pairs of contacts 47 and 48 for manual operation, one contact of each pair being connected with a source of electric energy. The other contact 44 is connected to one contact 63 of each switch 64 of the selector switch 52, and the other contact 63 of each switch 64 is connected with the respective rail 29 and also with one of the contacts 67 of all of the switches 66 of the selector switch 53. The other contact 67 of each switch 66 is connected to the corresponding contact 33 of each rail 29.

Finally, the motor control circuit includes an interference preventing device 49 and stop change-over switches 50 and 51 in the motor field supply conductors 46 and 45 respectively. The two stop change-over switches serve to interrupt the energization of the motor 11 when the film has been unwound in the set direction of movement in the case of a manual setting of the film, which will be explained hereinafter.

The embodiment shown in FIGS. 5 and 6 is substantially identical except that it is adapted for projecting a small image in enlargement from a small strip, which moves between an optical system 36 and a condenser 37 of a projector 38 onto the screen 2′ within the frame 1′. The feed screw 27′ is driven by the roller 18′ by means of pairs of bevel wheels 39, 40, 41, which are interconnected by shafts 42, 43. The other parts of the device are equivalent to those described in connection with the preceding embodiment and are identified by like primed reference numerals.

The operation of both of the foregoing embodiments is identical and is adapted to project individual sections of a map onto the screen 2 or 2′. For this purpose the user has a chart of the map such as shown in FIG. 2, and which is divided by a grid into those sections which are successively reproduced on the film 4. Markings in horizontal and vertical direction are provided for the fields of the map and correspond to the markings 5, 6 on the device. If, e.g., the map section "1E" of the map shown in FIG. 2 is to be projected on the screen 2, 2′ the setting knob 7 in FIG. 1 is set to the mark "1" and the setting knob 8 is set to the mark "E". As is apparent in FIG. 7, this closes the contacts 67 of the switch 66 designated as "1" in the multiple selector switch 53 and also the contacts 63 of the switch 64 designated as "E" in the group switch 52. Then the switch 9 is pressed, whereby the contacts 44 are closed. The current then flows via the switch 64 identified as "E" of the group switch 52 to the associated rail 29 identified as "E" and energizes by way of contact 61 the associated switch element 30. Depending on the position of this switch element on the uppermost or lowermost step of the rail 29 it will be connected by the contact 62 to the lower contact 32 or the upper contact 31 and the current will flow through the conductors 45 or 46 to energize the motor 11 to run in the right- or left-hand sense. In accordance therewith the motor 11 drives the left-hand or right-hand reel 3, 3a which begins to wind the film accordingly. The other reel runs freely to release the film. Together with the film 4, the feed tape 55 is wound in the same sense. This causes the feed screw 27 and the carriage 28 to be driven by means of the pinion 20, the roller 18 and, in the embodiment of FIGS. 3 and 4 the gears 21, 22, 23, 24 and the bevel wheels 25, 26, and in the embodiment of FIGS. 5 and 6 the pairs of bevel wheels 39, 40, 41 so that the particular switch 30 moves from its original position in one direction or the other towards the intermediate step of the respective rail E. As soon as the respective switch 30 has moved onto the intermediate step it will disengage the respective contacts 31, 32 and break this portion of the circuit through the motor 11. Depending upon the relative position of the switch carriage 28, its movement may continue if the circuit remains closed through the respective contact 33, in the present case the contact identified as "1" on the one hand by the contact strip 34′, 34″ connected to the conductor 45 or 46 for the right- or left-hand operation of the motor and on the other hand by the multiple selector switch 53 until the insulated portion 35 of the switch element 34, which is being driven by the carriage, as has already been mentioned, lies over live contact 33. At this time the desired map section 1E is visible on the screen 2 and the device is deenergized.

The described device is not only suitable for an automatic setting of the desired map section, as has been described hereinbefore, but may also be used to move the film as long as desired in one direction or the other and to effect a manual setting. For this purpose the switch knob 9 (FIG. 1) is constructed as a rotary switch. When it is rotated in one direction or the other the contacts 47 or 48 shown in FIG. 7 are closed and the motor 11 is energized for rotation in the desired sense until the switch 9 is again returned to its intermediate position by hand. As the carriage 28 is driven by the feed tape 55 also during manual setting, the automatic operation can be effected in each position of the film 4 attained as a result of this manual setting if the switch 9 is in its intermediate position and it is not necessary to return the film to the position which it had before the manual setting.

For the exchange of the film reel the frame 1 with the screen 2 can be swung open about a hinge.

Without departing from the invention, various modifications in structure are possible. For instance, gears connected to the appertaining rollers 18 may be provided at both ends of the feed screw 27 rather than only at one end, as shown, and these gears may be constructed as desired. The markings may be provided directly on the film to eliminate the need for a separate feed tape.

As has already been mentioned the described embodiments of the device are used with a film on which the sections of the map to be shown are reproduced.

Different picture strips may be used within the scope of the invention. For instance, printed map sections may be adhesively applied to a flexible strip of fiber material, plastic or the like and may thus be moved into the field of view of the user, e.g., a frame opening, with the aid of the described feeding device. The may sections, pictures or the like may also be directly printed or applied by other methods on the moved flexible carrier.

What is claimed is:
1. A device for selecting and displaying a desired frame of a strip formed by a succession of the individual fields of a sheet divided by a grid into rows and columns; a reel on which one end of a strip may be wound, a second reel aligned with the first reel and on which the other end of the strip may be wound, means between said reels for guiding the strip through a display position when the strip travels from one to the other of said reels, a reversible motor for selectively driving the reels, and a control circuit for selectively energizing said motor and including a group of parallel control rails equal in number and corresponding to the rows of fields of the subdivided sheet, each of said control rails having steps and a group of contacts equal in number and corresponding to the columns of fields of the subdivided sheet, said groups of contacts being juxtaposed with corresponding steps of each rail; a switch carriage movable along said rails and supporting for cooperation with each rail a single wiping contact, a change-over switch and a dual wiper contact, said single wiping contacts being movably mounted on said carriage and having sliding engagement with the steps of the respective rails, said change-over switches being cooperative with the respective single wiping contacts and having contacts selectively engageable by their wiping contacts in accordance with the positioning of the latter by the rail steps, and said dual wiper contacts each including two wiper contacts spaced by an insulated wiper and slidably engageable with the group of contacts on the respective rail; two multiple selector switch blocks each including a plurality of individual switches, the switches of one block being connected respectively to that rail which corresponds to the row of the desired field and the switches of the other group being connected respectively to the contacts of the rail groups of contacts which are associated with the column of the desired field, circuitry connecting said change-over switches and said dual wiper contacts with said motor to reversibly energize it in either direction of rotation, a master control switch for connecting said switch blocks with a current source, and means driven by said motor and drivingly connected to said switch carriage for moving said carriage in synchronization with said strip and energizing said motor in accordance with the setting of said switch blocks upon actuation of said master control switch.

2. Apparatus according to claim 1, wherein each rail has at least the equivalent of two of three steps and the intermediate steps of the several rails are relatively staggered so that the transition from the intermediate step to the upper step of one rail is in alignment with the transition from the lower step to the intermediate step of the respective next following rail and vice versa.

3. Apparatus according to claim 1, wherein said groups of contacts are juxtaposed with the intermediate step of the rail associated therewith.

4. Apparatus according to claim 1, wherein the change-over switches operated by the wiping contacts of the carriage have three positions, which correspond to the three steps of the rails, the change-over switches being connected in separate circuits, which correspond to the two directions of rotation of the motor, in their two outer positions, which correspond to the lower and upper steps of the rail, and being open in the intermediate position.

5. Apparatus according to claim 1, wherein the wipers disposed on the same side of the insulating portion are interconnected, that these contacts of the change-over switches operated by the wiping contacts which correspond to the upper and lower steps of the rails, respectively, are interconnected and that the wipers and contacts corresponding to the same direction of rotation of the motor are connected to each other.

6. Apparatus according to claim 1, comprising a manually operated switch having a neutral intermediate position and connected in parallel to the motor enables the direct energization of the motor for operation in one direction of rotation or the other.

7. A device as set forth in claim 1, characterized in that the strip provided with the pictures moves together with said synchronizing means which includes a feeding tape having the same thickness, which feeding tape is in driving connection with the switch block and is wound up on the same reel as the strip.

8. A device as set forth in claim 7, characterized in that the feeding tape is provided with marks in interengagement with countermarks.

9. A device as set forth in claim 8, characterized in that the marks consist of perforations which are in mesh with a pinion connected to a roller guiding the strip.

References Cited in the file of this patent

UNITED STATES PATENTS

| | | |
|---|---|---|
| 1,818,228 | Lund | Aug. 11, 1931 |
| 2,296,141 | Brown et al. | Sept. 15, 1942 |
| 2,464,220 | Duncan et al. | Mar. 15, 1949 |
| 2,660,920 | McChesney | Dec. 1, 1953 |
| 2,701,979 | Pratt et al. | Feb. 15, 1955 |
| 2,903,941 | Bornemann | Sept. 15, 1959 |